Figure 1:
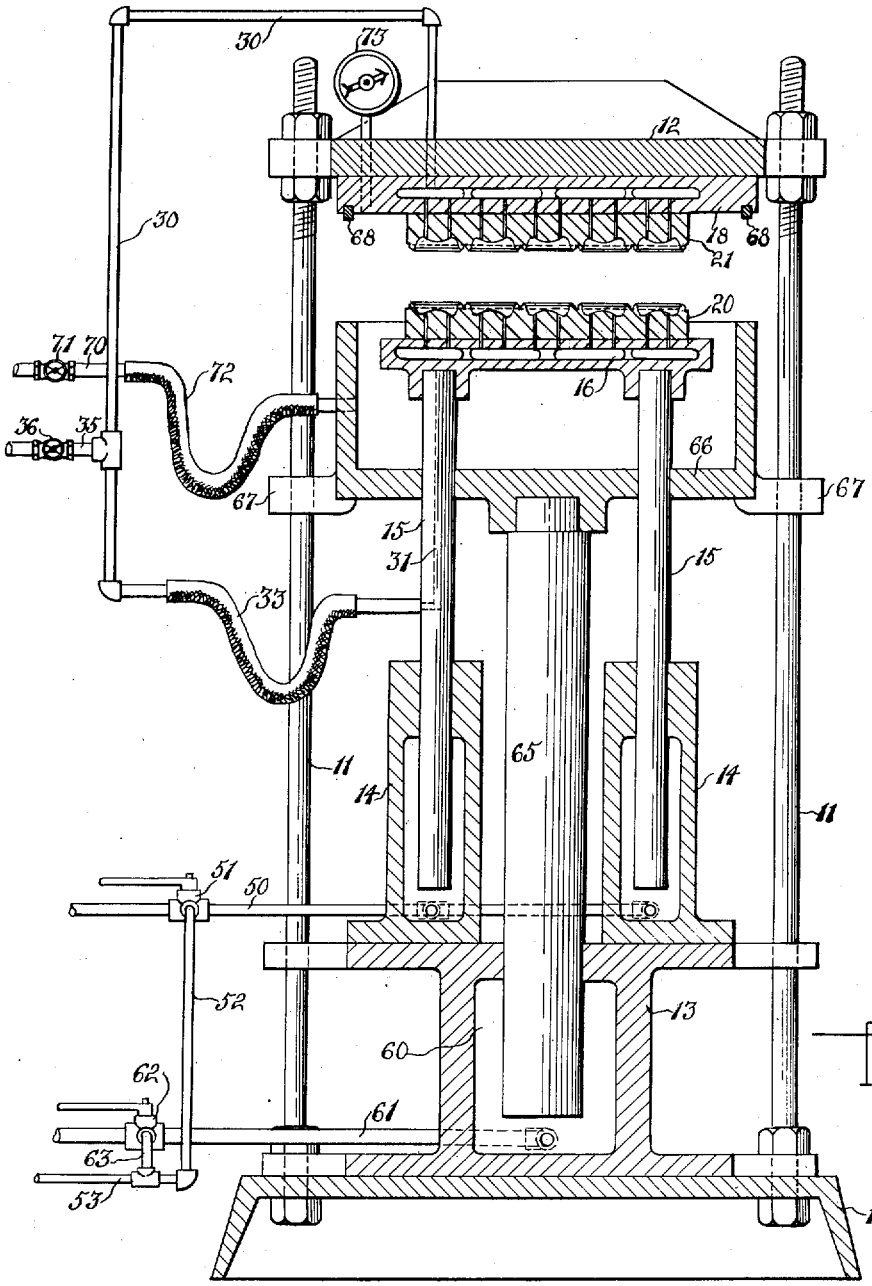

F. T. ROBERTS.

PROCESS OF AND APPARATUS FOR MAKING HOLLOW RUBBER ARTICLES.

APPLICATION FILED JUNE 3, 1916.

Reissued Mar. 4, 1919.

14,604.

2 SHEETS—SHEET 1.

Inventor;
Fred Thomas Roberts,
By Baker Macklin,
Attys.

F. T. ROBERTS.

PROCESS OF AND APPARATUS FOR MAKING HOLLOW RUBBER ARTICLES.

APPLICATION FILED JUNE 3, 1918.

Reissued Mar. 4, 1919.

14,604.

2 SHEETS—SHEET 2.

Inventor;
Fred Thomas Roberts,
By Dabis & Macklin,
Attys.

UNITED STATES PATENT OFFICE.

FRED THOMAS ROBERTS, OF CLEVELAND HEIGHTS, OHIO, ASSIGNOR TO THE ARANAR COMPANY, OF CLEVELAND, OHIO, A CORPORATION OF OHIO.

PROCESS OF AND APPARATUS FOR MAKING HOLLOW RUBBER ARTICLES.

14,604. Specification of Reissued Letters Patent. Reissued Mar. 4, 1919.

Original No. 1,219,351, dated March 13, 1917, Serial No. 125,598, filed October 14, 1916. Application for reissue filed June 3, 1918. Serial No. 238,014.

DIVISION B.

*To all whom it may concern:*

Be it known that I, FRED THOMAS ROBERTS, a citizen of the United States, residing at Cleveland Heights, in the county of Cuyahoga and State of Ohio, have invented a certain new and useful Improvement in Processes of and Apparatus for Making Hollow Rubber Articles, of which the following is a full, clear, and exact description, reference being had to the accompanying drawings.

This invention relates to the production of hollow rubber articles which may contain, either permanently or temporarily, internal fluid pressure. A convenient illustration of such an article is a playing ball, though many sorts of articles may be constructed by the same process and apparatus, as for example, bulbs of various sorts, rubber toys, hot water bottles, tubes for pneumatic tires, etc., in all of which cases an internal fluid pressure is desirable, at least until after the article has been vulcanized.

One of the objects of the invention is to provide for the cheap and rapid formation of the article by pneumatic pressure from sheet rubber stock. In many cases, it is very desirable that the wall of the article be of a substantially uniform thickness throughout. I have found that when stock is seated in a mold cavity by pneumatic pressure, there is a tendency to stretch the stock in the regions adjacent to the center of the sheet which prevents the uniform thickness desired. To enable the pneumatic seating and at the same time preserve uniform thickness, I seat the stock pneumatically in a distorted mold which is arranged with one or more inward protuberances, forming a fixed portion of the mold. These protuberances support the stock adjacent to the central region and prevent the stretching, so that a wall of substantially uniform thickness is provided when the stock has become seated in this forming mold.

My mold is so made that the inward projection corresponds substantially in surface extent to the normal outward convexity at this region. In other words, the surface area of my distorted mold cavity is substantially the same as the area of a normal cavity in which an article of the desired continuously convex shape would naturally be formed. After the formation of the article in my distorted mold, I vulcanize it in a mold having the shape of the finished article. In such mold, the inward protuberance in the formed article bows outwardly and becomes a normal outward convexity without material local stretching.

In addition to the feature of substantially uniform thickness of the wall, provided by my system of forming and vulcanizing articles, the inward protuberance enables the mold to be of materially less depth from that normally required, resulting in a truer and quicker seating of the article, and thus enabling a more rapid production of high grade articles.

My invention comprising both the process of making hollow rubber articles and the apparatus or mold therefor, is hereinafter more fully described and its essential characteristics set out in the claims.

Figure 8:
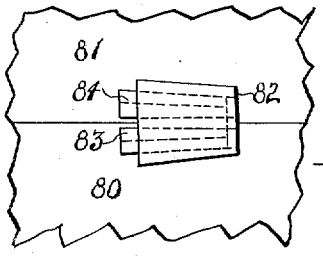
Figure 3:
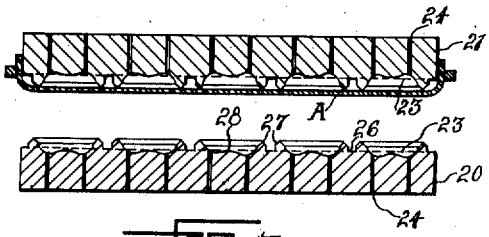
Figure 2:
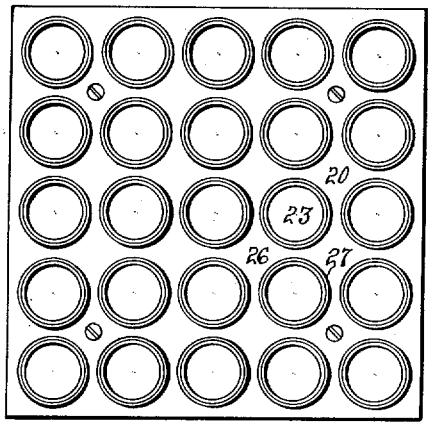
Figure 5:
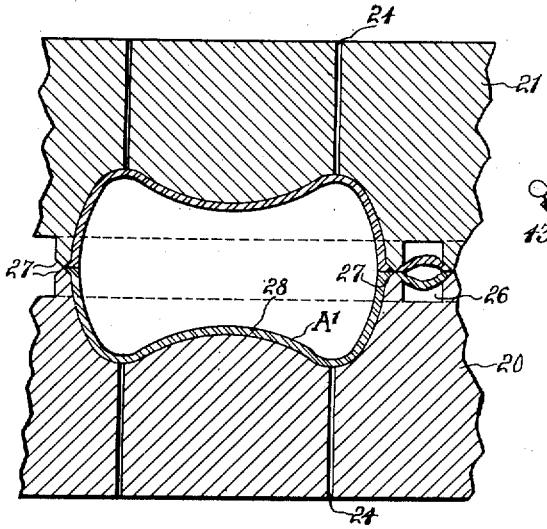
Figure 4:
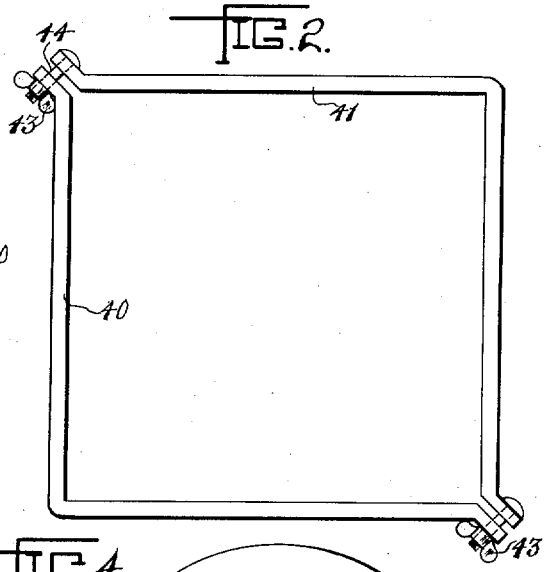
Figure 6:
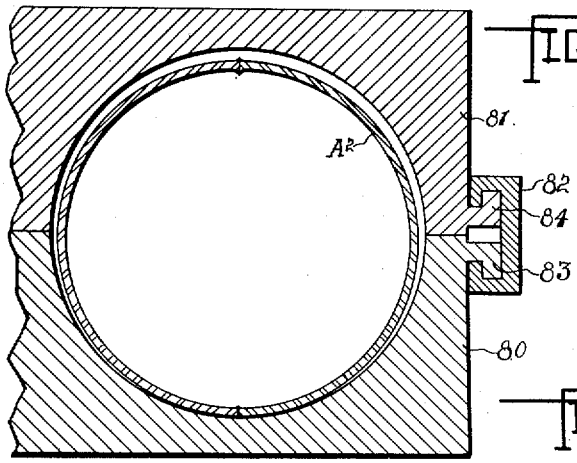
Figure 7:
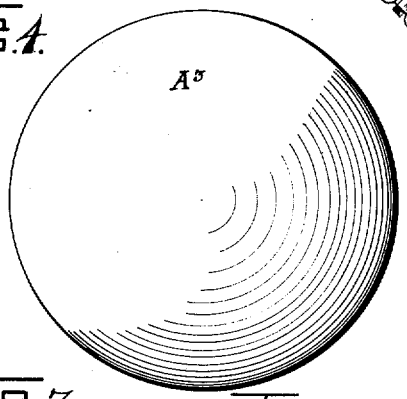

In the drawings, Figure 1 is a side elevation of a mold press equipped with my peculiar forming molds and with means for causing the pneumatic seating of the stock; Fig. 2 is a plan of a mold plate which may be employed; Fig. 3 is a cross section of two of such mold plates showing their relative position before they are brought together; Fig. 4 is a plan of a clamp which may be used to hold a rubber sheet to one of the mold plates, as illustrated in Fig. 3; Fig. 5 is an enlarged view in vertical section illustrating one of the mold cavities and showing rubber stock seated therein; Fig. 6 is a view on the same scale as Fig. 5, showing a vulcanizing mold which may be employed for the article formed by the distorted mold of Fig. 5; Fig. 7 is an outside view of a ball produced by the molds of Figs. 5 and 6; Fig. 8 is a detail illustrating the hollow wedge for clamping two mold plates, this wedge being shown in cross section in Fig. 6.

In Fig. 1, 10 indicates the base of a mold press from which rise standards 11, carrying a head 12. On the base is shown a frame 13 supporting a pair of cylinders 14, from which rise plungers 15, which carry at their tops a hollow platen 16. The hollow platen 18 is also shown as secured to the under side of the head 12. Each of these platens has passageways which communicate with cavities in the mold members 20 and 21, secured to the respective platens.

Figs. 2 and 3 illustrate one form of mold plate which may be secured to the platens by screws 22. The cavities 23 as they appear in Fig. 3, have the peculiar inward protuberances of this invention heretofore referred to and which will be hereinafter more fully described. These cavities have vents 24, which are adapted to register with the openings in the hollow platens.

30 in Fig 1 indicates a vent pipe leading from the platen 18. 31 designates a passageway within one of the plungers 15 leading from the platen 16. This passageway communicates with a flexible pipe 33. The pipes 30 and 33 are shown as joining and leading outwardly by a T connection through the pipe 35 which is provided with a valve 36.

If the pipe 35, beyond the valve be connected with a suitable vacuum pump, vacuum may be established in the mold cavities and thereby cause the rubber stock stretched across the mouths of the molds to be pneumatically seated.

Fig. 3 shows a sheet of stock A held across the upper mold, and a similar sheet may be held across the lower mold. Suitable means is provided to clamp these sheets at the edges of the mold plate. For this purpose, I may employ a rectangular frame shown in Fig. 4. As shown, this frame consists of two members 40 and 41, each extending about two sides of the mold and provided at their ends with means for drawing the members together, as for example, the thumb nuts 43 on bolts 44.

After the stock has been pneumatically seated by suction as described, the two molds are brought together to bring the two parts of the article into conjunction, thus entrapping within each article air having whatever pressure surrounds the mold. It is convenient to bring the mold members together by hydraulic pressure. For this purpose the cylinders 14 and plungers 15 are provided. 50 indicates a pipe adapted to convey liquid under pressure to the cylinders 14. 51 is a valve controlling this pipe, adapted to place it in communication with the supply or close it entirely or drain it to the pipes 52 and 53.

It should be noted that when these two mold parts are brought together with rubber stock seated in them respectively they produce a series of hollow articles as shown at A′ in Fig. 5 with air entrapped within them. I prefer to provide a depressed portion 26 of the mold plate about each mold cavity and bring the walls about the cavities to an annular edge as shown at 27. By this construction the sheets of rubber are cut in two around the article as the mold members come together, the excess rubber passing into the space 26 surrounding the cavities. It will be noted that the annular wall between the mold cavities and the surrounding space is tapered both inwardly and outwardly in coming to the cutting edge. This enables the rubber of the two sections to be squeezed together between metal mold surfaces as the molds come together, thus making an effective seam. The outward rib thus produced is absorbed in the vulcanization.

For many purposes air of atmospheric pressure within the article is sufficient, or such pressure may be increased by some heat-expanding chemical placed in the article before it is closed, as is well understood in this art. In either case I prefer to effect the seating of the article by vacuum applied to the pipe 35. Whenever a high fluid pressure is desired to be permanently maintained within the article I prefer to effect this by surrounding the molds with compressed air and entrapping such air within the article as the parts are brought together. Fig. 1 shows mechanism for accomplishing this, as will be described.

Within the frame member 13 is a central hydraulic cylinder 60 adapted to be fed by a pipe 61 controlled by a valve 62 which may drain through the passageway 63 to the pipe 53. Rising from this cylinder 60 is a plunger 65 carrying a box 66 which has ears 67 slidably embracing the standards 11. The plungers 15 extend through the base of this box 66 in a slidable but air-tight manner, stuffing boxes, which may be employed, being omitted for simplicity in the drawing. Directly above the wall of the box 66 is a rectangular gasket 68 carried on the under side of the platen 18. 70 indicates a pipe for conveying compressed air to the interior of the box 66, this pipe being connected with the box through a flexible connection 72 and being controlled by a valve 71.

Now if it be desired to entrap within the article air of higher pressure than the atmospheric, hydraulic pressure may be admitted to the cylinder 60, raising the box 66 and forming a closed chamber about the separated mold members; then the valve 71 is opened and compressed air of any pressure desired admitted to the interior of the box 66, this pressure being indicated by the gage 73. When this surrounding atmosphere of compressed air is employed the vacuum pump need not be used and the pipe 35 may be simply a vent pipe. When the valve 36 controlling this vent is open, the superior surrounding pressure will seat the stock in the mold cavities. When the desired pressure has been obtained within the box, the valve 51 is opened and the plunger 15 raised, thus closing the mold within the surrounding air under pressure.

The apparatus shown in Fig. 1 may be employed either to seat the article by suction and entrap atmospheric air, or to seat the article by compressed air and entrap some of such air, or vacuum seating may be employed in conjunction with supplying compressed air to the interior. The vacuum seating has the advantage that it enables visible inspection to the interior of the article after its parts have been formed.

After the parts of the raw rubber article have been brought together and their edges joined by pressure and at the same time the individual articles cut out as explained, the articles are removed from the molds 20 and 21 for vulcanizing. It is to be understood that if compressed air is entrapped within the formed article its pressure does not exceed the surrounding atmosphere by an amount which the unvulcanized seam can hold. Accordingly it is possible to separate the forming molds and take out the closed article and transfer it to a vulcanizing mold. Such vulcanizing mold is illustrated in Fig. 6 and is shown as having two mold plates 80 and 81 clamped together by a beveled wedge-shaped stirrup 82 (shown also in Fig. 8) which overhangs wedge ribs 83 and 84 on the mold members.

It will readily be seen that by forming the parts of a number of articles from raw rubber sheet stock pneumatically seated and cut out as the mold members are brought together a very rapid and economical operation may be effected. The delay, incident to forming the parts by male and female dies, is avoided, as in my process it is all accomplished in one mechanism and without transfer. As raw rubber sheets are employed in my operation, the parts cut out around the articles are not wasted (as would be semi-cured or vulcanized stock) but may be returned immediately to the calendering machine and rerolled into sheets without waste.

While the pneumatic seating of sheet stock stretched across the mouths of mold cavities has advantages of economy and rapidity, as above explained, the natural effect of such pneumatic seating is to stretch the stock adjacent to the center of the disk portion stretched over the cavity, as such central region has the least support. Accordingly this central region is naturally thinner than the stock nearer the edges when it is seated. This is a great disadvantage as many articles require walls of substantially uniform thickness. I have discovered that the advantages of the pneumatic seating of sheet stock may be retained without the disadvantages of the central stretching by making the mold cavities with inward protuberances to support the stock in the central region and prevent undue stretching. These inward protuberances are rigid and preferably integral parts of the mold so that no extra mechanism is required on account of them. They result in the article being formed with a substantially uniform thickness of wall, but with normally convex portions concaved or bowed inwardly. The amount of the inward bowing is substantially the same as the normal outward bowing for the same region so that after the article is formed with the concave portions these readily assume the normal convex shape when the article is removed from the mold or during the subsequent vulcanization.

Figs. 3 and 5 show my distorted mold adapted particularly for making a spherical ball, this mold having the inward protuberance 28 which supports the central portion of the stock and causes the stretching action, as the stock is pneumatically seated, to take place where needed instead of at the center of the article. The inward protuberance supports the central portion so that the stock sinks gradually and easily into the mold cavity and a substantially uniform thickness of wall is maintained.

It will be seen from these views that the inward protuberances merge by easy curves with the spherical zones of the mold and are of such size and shape that the superficial area of the distorted mold is substantially the same as that of a spherical mold of the same diameter. The result is that when the article is forced pneumatically to its seat in the distorted mold shown, it is of the proper size to become a sphere without serious stretching, and is of substantially the same thickness throughout.

Another advantage of a forming mold having inward protuberances is that when the formed article assumes its true shape it has an increased cubical content, resulting in a corresponding reduction in internal pressure. Accordingly the compressed air entrapped within the formed article may exceed the pressure of the surrounding atmosphere by even a greater amount than can be retained simply by the adhesion of raw rubber; for, as the article is removed from the forming mold, the first action will be for the internal pressure to force the dents outwardly and thus reduce such pressure.

When the distorted ball is removed from the mold of Figs. 3 and 5, it is put into a spherical vulcanizing cavity, as shown in Fig. 6. It is convenient to make the article slightly smaller in diameter than that of the vulcanizing cavity, as illustrated at $A^2$ in Fig. 6, as this provides for the expansion of the article during vulcanization and also enables the article to be very readily placed in the vulcanizing mold. The increased size of the article after vulcanization and its removal from the vulcanizing mold is illustrated at $A^3$ in Fig. 7.

If the internal pressure in the article is greater than the surrounding atmosphere, the article will assume a spherical shape as soon as removed from the mold of Figs. 3 and 5. If the higher internal pressure, obtained by using the box 66, is not employed, the article may be of a dented shape when it is placed in the vulcanizing mold, but it will assume true spherical shape when the vulcanizing mold is heated, as the air in the mold cavity outside of the article will leak out between the mold plates.

Having thus described my invention what I claim is:

1. The process of making hollow rubber articles, consisting of pneumatically seating a part of the article in a mold cavity which has a rigid inward protuberance, closing such seated part upon another part of the article, then transferring such closed article to a vulcanizing mold having a cavity of the shape of the finished article, and thereafter vulcanizing the article while in such vulcanizing mold.

2. The process of making hollow rubber articles, consisting of pneumatically seating the parts of the article in mold cavities which have rigid inward protuberances, bringing two of such seated parts together under pressure to form a seam, then transferring such closed article to a vulcanizing mold having a cavity of the shape of the finished article, and thereafter vulcanizing the article while in such vulcanizing mold.

3. The process of making hollow articles, comprising the placing of plastic stock across the mouth of a mold cavity which has a rigid wall inwardly distorted from the shape which the finished article is to have, establishing a preponderance of air pressure on the side of the stock opposite to the cavity, whereby the stock becomes seated in the cavity, bringing such seated part into conjunction with another part to make a closed article, then transferring such article to a mold having the shape of the finished article, and curing the article while so held.

4. The process of making hollow articles, comprising the placing of plastic stock across the mouth of a mold cavity which has a rigid wall inwardly distorted from the shape which the finished article is to have, partially exhausting the air from such cavity to cause the stock to seat therein, bringing such seated part into conjunction with another part to make a closed article, then transferring such article to a mold having the shape of the finished article, and curing the article while so held.

5. The process of making convex hollow rubber articles consisting of primarily forming the article in a distorted mold having a rigid inner surface of substantially the same area as the finishing mold but of inwardly protuberant contour, then transferring the article to such finishing mold having a continuously convex contour, and vulcanizing it therein.

6. The process of making hollow rubber articles having a convex exterior, consisting of primarily forming the article with certain regions of its wall externally concave, thereafter transferring the article to a vulcanizing mold having a convex surface opposite such concavity and of substantially the same superficial area as said cavity, internal pressure being provided to change the concavity of the article to a convexity corresponding to the surface of the vulcanizing mold.

7. The process of making hollow rubber articles, consisting of bringing the parts of the article together in an enveloping atmosphere of compressed fluid, such parts being held in mold cavities which have inward protuberances, then transferring such closed article to a vulcanizing mold having a cavity of the shape of the finished article, and thereafter vulcanizing the article while in such vulcanizing mold.

8. The process of making hollow articles, comprising the placing of plastic stock across the mouth of a mold cavity which has a rigid wall inwardly distorted from the shape which the finished article is to have, venting such cavity while supplying compressed fluid to the other side of the stock, bringing such seated part into conjunction with another part to make a closed article, then transferring such article to a mold having the shape of the finished article, and curing the article while so held.

9. The process of making hollow rubber articles, comprising the placing of rubber stock across the mouth of a mold cavity while said cavity is located within an inclosure which contains air under pressure, said mold cavity being inwardly distorted from the shape which the finished article is to have, venting such cavity to a point outside of the inclosure, to cause the compressed air to seat the article, bringing such seated part into conjunction with another part to make a closed article containing air, then transferring such article to a mold having the shape of the finished article, and vulcanizing the article while so held.

10. As a new article, a forming mold for a hollow rubber article of convex exterior, said mold having a cavity formed with a rigid inward protuberance.

11. A forming hold for a hollow rubber article having a convex exterior, the mold having cavities, each provided with a rigid inward protuberance and of substantially the same area as the exterior of the article in its normal shape.

12. A mold for forming a hollow rubber article of convex exterior, having a cavity provided with a rigid inward protuberance, and cutting edges surrounding the mold cavity.

13. A separable mold for forming a hollow rubber article of convex exterior, said mold having cavities each provided with a rigid inward protuberance whereby stock forced into the mold is caused to retain uniform thickness, and cutting edges at the perimeter of each cavity.

14. In an apparatus for forming hollow rubber articles, the combination of a forming mold and a vulcanizing mold, the latter having spherical cavities, and the forming mold having its cavities spherically convex adjacent to the edge of the cavity but concaved inwardly in the central region by a gradual hump which does not rise to the plane of the rim of the cavity.

15. In an apparatus for forming hollow rubber articles the combination of a forming mold and a vulcanizing mold, the latter having spherical cavities, and the forming mold having cavities provided with rigid inward protuberances, the surface of the latter cavities being substantially the same as the cavities of the vulcanizing mold.

16. The combination of a mold for hollow rubber articles of convex exterior, the mold cavities having rigid inward protuberances and passages leading from the cavities.

17. The combination of a multiple mold for hollow rubber articles of convex exterior, the mold cavities each having rigid inward protuberances, passages leading from substantially the deepest points in the cavities, and means connected with the passages for exhausting the cavities.

18. The combination of a separable mold for hollow rubber articles of convex exterior, the mold cavity having a rigid inward protuberance, cutting edges on each mold member around the cavity, passages leading from each cavity and connected with a means for exhausting the air therefrom.

19. In an apparatus of the character described, the combination of a forming mold having a rigid inner surface which has an inward protuberance, producing a central region of the article which is externally concave, and a corresponding vulcanizing mold to which the article is transferred and which has an inner surface of substantially the same area but of a continuously convex contour.

20. In an apparatus of the character described, the combination of a cavitary mold distorted from the finished shape of the article to provide an inward projection, means for establishing an atmosphere of compressed fluid about the mold, means for venting the cavity of the mold to a point outside of said atmosphere to cause the article to seat in said cavity, and a mold of the shape of the finished article having an internal surface of substantially the same area as that of the distorted mold.

21. In an apparatus of the character described, the combination of a finishing mold corresponding to the shape of the finished article, a forming mold having substantially the same internal area as the finished mold but having an inward projection, means for venting said forming mold to the outside air, means for establishing an atmosphere of compressed air about the forming mold, whereby rubber stock placed across the mouth thereof may be seated in its cavity, and means for bringing such stock into conjunction with other stock while within the atmosphere of compressed air.

22. In an apparatus of the character described, a two-part mold, each member having a series of cavities bounded by walls coming to an annular edge, whereby when two of such mold members are brought together material may be sheared off around the edges of the cavities, there being vents from said cavities, and means for opening and closing the vents.

23. In an apparatus of the character described, a forming mold having a series of cavities bounded by walls coming to an annular edge, whereby when two of such mold members are brought together material may be sheared off around the edges of the cavities, said cavities having vents, means for controlling the vents, and means for establishing a greater pneumatic pressure between two pieces of interposed stock than there is between either piece of stock and the base of the cavity.

24. In an apparatus of the character described, the combination with an inclosure to which compressed fluid is supplied, of a two-part forming mold therein having a series of cavities bounded by walls which come to an annular edge and rise above the adjacent surrounding surface of the mold, whereby when two of such mold members are brought together interposed material may entrap fluid and may be sheared off around the edges of the cavities.

25. In an apparatus of the character described, the combination with a vulcanizing mold having substantially the form of the finished article, of a forming mold having a distorted shape but substantially the internal area of the vulcanizing mold and having a series of cavities bounded by walls coming to an annular edge, whereby when two of such mold members are brought together material may be sheared off around the edges of the cavities, means for establishing an atmosphere of compressed fluid about such mold members, and means for venting the cavities to a point outside of said atmosphere.

26. A mold for forming a hollow rubber article of convex exterior, comprising a plate having cavities each provided with a rigid inward protuberance at the base and an annular cutting edge at the rim.

27. A forming mold for a hollow rubber article having a convex exterior, said mold comprising a plate having a multiplicity of cavities, each provided with a rigid inward protuberance the superficial area of the cavity being substantially the same as that of the exterior of the corresponding part of the article in its normal shape.

28. The combination with a forming mold for a hollow rubber article, said mold having a cavity formed with a rigid inward hump, a passageway communicating with the cavity at one side of the hump, and means for applying suction to said passageway.

29. The combination, in a mold for hollow rubber articles of convex exterior, of mold cavities having a rigid inward protuberance and passages leading from substantially the deepest points of the cavities.

30. The process of making hollow rubber articles, consisting of pneumatically seating a part of the article in a mold cavity which has a rigid inward protuberance, the top of which is below the plane of the rim of the cavity, closing such seated part upon another part of the article, then transferring such closed article to a vulcanizing mold having a cavity of the shape of the finished article, and thereafter vulcanizing the article while in such vulcanizing mold.

31. The process of making convex hollow rubber articles consisting of primarily forming the article in a distorted mold cavity having a rigid inner surface of substantially the same area as the finishing mold but having a gradual inward protuberance, the top of which is below the plane of the rim of the cavity.

32. The process of making hollow rubber articles consisting of forming the article in a distorted shape with an inward projection which is existent at the completion of the forming operation, and thereafter vulcanizing the article in a mold which provides space for such inward projection to be moved outwardly.

33. The process of making hollow rubber articles having an external convexity consisting of primarily forming the article with an inward convexity which is existent at the end of the forming operation, and thereafter vulcanizing the article within a mold which has a concavity opposite that region of the article which, when formed, is inwardly convex.

34. The process of making hollow rubber articles which when finished have an external convexity comprising forming a portion of the article with an inward convexity having a superficial area substantially equal to that of the corresponding outward convexity of the finished article, such inward convexity being existent at the end of the forming operation, thereafter transferring the article to a vulcanizing mold which has a concavity in the region corresponding to said inward convexity and of substantially the same superficial area, and vulcanizing the article in such vulcanizing mold.

In testimony whereof, I hereunto affix my signature.

FRED THOMAS ROBERTS.